United States Patent
Duchet

(10) Patent No.: US 6,256,426 B1
(45) Date of Patent: Jul. 3, 2001

(54) SEMICONDUCTOR PHASE MODULATOR

(75) Inventor: Christian Duchet, Marcoussis (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/456,907

(22) Filed: Dec. 7, 1999

(30) Foreign Application Priority Data

Dec. 8, 1998 (FR) .................................................. 98 15486

(51) Int. Cl.$^7$ .................................................... G02F 1/035
(52) U.S. Cl. .................................................... 385/3; 385/1
(58) Field of Search ........................... 385/1–4; 372/26, 372/45; 359/237, 238

(56) References Cited

U.S. PATENT DOCUMENTS 4,889,402 * 12/1989 Reinhart ..................................... 385/2
5,250,462 * 10/1993 Sasaki et al. ............................. 438/24

OTHER PUBLICATIONS

Lee, S. et al: "Analysis and design of high–speed high–efficiency GaAs–AlGaAs double–heterostructure waveguide phase modulator" IEEE Journal of Quantum Electronics, Mar. 1991, USA, vol. 27, No. 3, pp. 726–736, XP000227529 ISSN: 0018–9197.

Duchet, C. et al: "Polarisation–insensitive modulator and influence of propagation direction on bulk electroabsorption" Electronics Letters, Jan. 30, 1997, IEE, UK, vol. 33, No. 3, pp. 233–235, XP002112314 ISSN: 0013–5194.

Chen, Y. et al.: "Polarization–independent strained InGaAs/InGaAlAs quantum–well phase modulators" IEEE Photonics Technology Letters, Oct. 1992, USA, vol. 4, No. 10, pp. 1120–1123, XP000316533 ISSN: 1041–1135.

* cited by examiner

Primary Examiner—James Phan
(74) Attorney, Agent, or Firm—Sughrue, Mion, Zinn, Macpeak & Seas, PLLC

(57) ABSTRACT

A semiconductor phase modulator comprises a lower cladding layer, an active waveguide and an upper cladding layer, deposited successively on a substrate made of III-V material. The active waveguide comprises at least one first active layer having a first photoluminescence wavelength and one second active layer of compensation having a second photoluminescence wavelength. The operating wavelength of the modulator is higher than the first photoluminescence wavelength by a value ranging from 80 to 200 nm, and it is greater than the second photoluminescence wavelength by a value of over 300 nm.

5 Claims, 3 Drawing Sheets

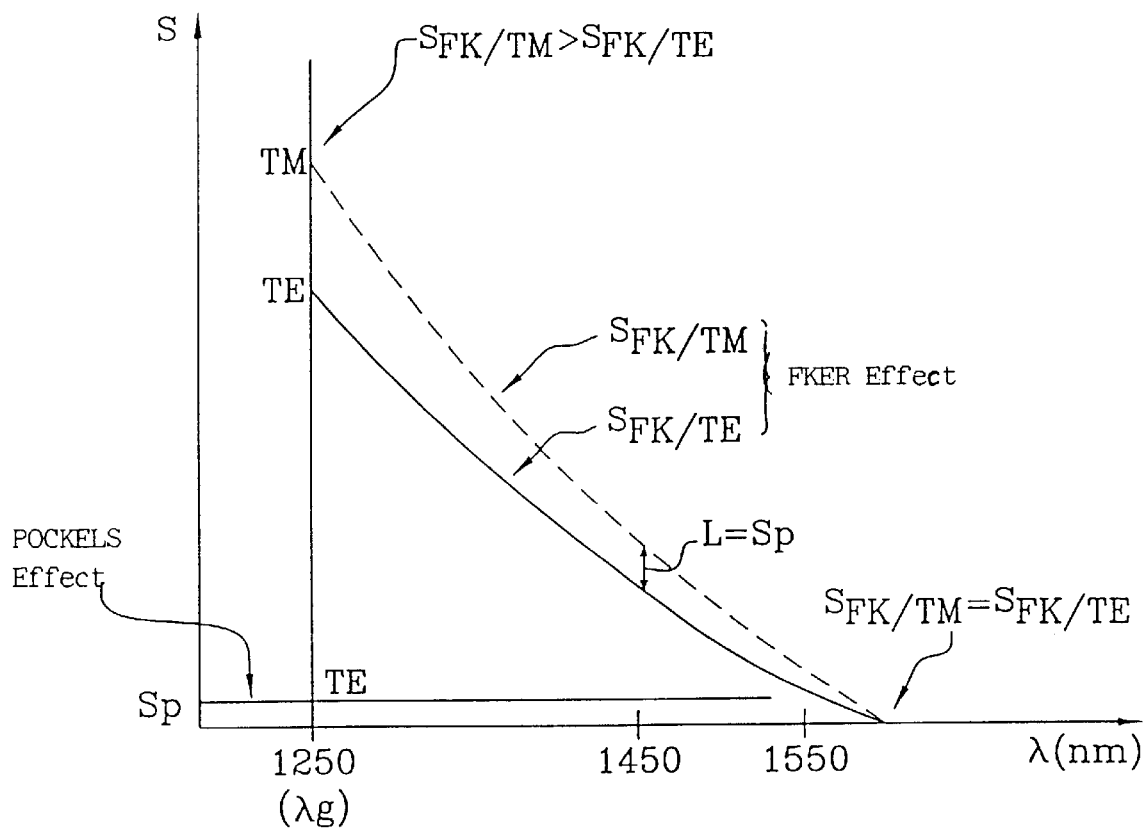
FIG.1  PRIOR ART
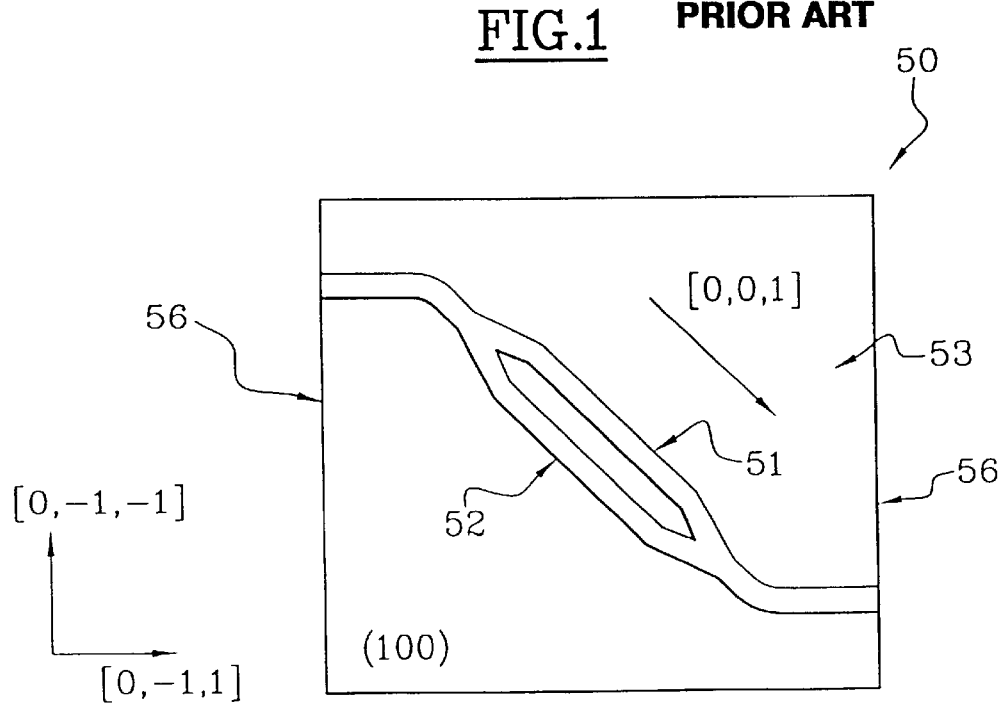
FIG.2  PRIOR ART

SEMICONDUCTOR PHASE MODULATOR

BACKGROUND OF THE INVENTION

1. Field of the Invention

The present invention is located in the field of semiconductor optical components used for optical transmission or the processing of optical data. It relates more particularly to all optical components comprising an interferometer structure using phase variations. To simplify the explanation of the invention, we shall refer hereinafter only to a Mach-Zehnder type interferometer structure. However, as has been stated, the object of the invention also extends, in its scope, to all other structures comprising a phase modulator.

One of the main problems that are generally sought to be resolved in integrated optics consists in making polarization-independent devices, namely devices that are independent of light polarization (namely TE, TM polarization).

2. Description of the Prior Art

Standard Mach-Zehnder type modulators, made with semiconductor materials, comprise stacks of layers on a substrate. This stack is made by successive deposits of a lower cladding layer, an active layer forming the active waveguide of the component and an upper cladding layer. The layers are deposited by a standard method of epitaxy. The first modulators in the prior art used substrates based on lithium niobate ($LiNbO_3$), which is a material highly dependent on the light polarization. This material was then replaced by indium phosphide InP. In general, the active waveguide is constituted by a non-doped single quaternary material, of the InGaAsP type for example.

The phase variation $\Delta j$, in a phase modulator, is proportional to the product of the variation of the refraction index $\Delta n$ in the active waveguide multiplied by the length L of this active guide. In fact, it is governed by the following relationship (1):

$$\Delta j=(2\pi/\lambda)\times\Delta n\times L \quad (1)$$

where $\lambda$ represents the operating wavelength. The operating wavelength is defined as the wavelength of the carrier wave used to ensure the working of the component. The variation of the refraction index $\Delta n$ is furthermore equal to the product $S\times\Delta E$ where S represents the sensitivity of the component and $\Delta E$ the variation of electrical field applied to ensure its operation. $\Delta E$ is also written as $\Delta V/e$, where $\Delta V$ represents the variation of the control voltage and e the thickness of the active waveguide. The relationship (1) can therefore be written as follows:

$$\Delta j=(2\pi/\lambda)\times S\times(\Delta V/e)\times L \quad (2).$$

From this relationship, it is deduced that, to reduce the control voltage in a phase modulator, it is necessary to increase the length. Now the length is a function of the capacitance C. Indeed, if the length L is increased, the capacitance C of the component is increased because C is given by the following relationship:

$$C=(\epsilon WL)/e \quad (3),$$

where W represents the length of the active waveguide and $\epsilon$ the permittivity. The relationship (2) therefore becomes:

$$\Delta j=(2\pi/\lambda)\times(1/(\epsilon W))\times S\times C\times\Delta V \quad (4).$$

This relationship shows that for a fixed capacitance C (hence for a fixed passband), the phase variation is independent of the length and the thickness of the active layer. Consequently, to reduce the control voltage $\Delta V$, it is necessary to increase the sensitivity S.

The aim of the invention therefore is to make a phase modulator that is insensitive to the light polarization and has high sensitivity, so that this phase modulator can be controlled with a low voltage.

The curves of FIG. 1, which represent the sensitivity S ($=\Delta n/\Delta E$) of a standard phase modulator as a function of the operating wavelength $\lambda$, illustrate the main phenomena brought into play during the working of this component.

A first phenomenon brought into play concerns the Franz-Keldysh effect. This phenomenon appears when an electrical field is applied to the component. It is expressed by a variation of absorption that occurs in the active waveguide. This phenomenon is always accompanied by a variation in the refraction index $\Delta n$ in the waveguide. This is why this phenomenon, throughout the rest of the description, is known as the Franz-Keldysh Electro-Refraction effect referenced FKER. This effect depends on the polarization of light. It is illustrated by the two curves, plotted in unbroken lines and dashed lines respectively, for the TE and TM modes of light polarization.

In the example illustrated in FIG. 1, the photoluminescence wavelength $\lambda g$ of the material used to form the active waveguide is 1250 nm. This means that if this material is illuminated with a wavelength below this photoluminescence wavelength $\lambda g$, the material becomes absorbent. By contrast, if it is illuminated with a wavelength greater than $\lambda g$, the material becomes transparent. The wavelengths in the range that can be used to make the component work must therefore be greater than the photoluminescence wavelength $\lambda g$ of the material constituting the active guide.

The curves of the sensitivity S of the component as a function of the operating wavelength $\lambda$, for the FKER effect, show that the closer the operating wavelength is to the photoluminescence wavelength $\lambda g$ of the material, the greater the increase in sensitivity S and the more dependent the FKER effect is on the TE and TM light polarization (the sensitivity $S_{FK/TM}$ is greater than the sensitivity $S_{FK/TE}$).

A second effect brought into play in this structure relates to the Pockels effect. This effect is expressed by a variation of the refraction index $\Delta n$ of the material constituting the active waveguide when an electrical field is applied. This phenomenon is independent of the operating wavelength $\lambda$ in the range of wavelengths commonly used for the operation of this structure. Furthermore, for the section generally used, this Pockels effect is always zero for the TM light polarization.

By contrast, for the TE light polarization, this phenomenon is highly dependent on the orientation of the guides with respect to that of the substrate. Indeed, if the guides are made according to an orientation that forms an angle $\alpha=0°$ with respect to the crystalline orientation of the substrate, a TE-related positive Pockels effect appears and is added to the first FKER effect described here above. By contrast, if this angle $\alpha$ is equal to 90°, the TE-related Pockels effect is negative and is deducted from the first effect FKER. When this angle is equal to 45°, the Pockels effect gets cancelled.

Given that, when the sensitivity S of a standard Mach-Zehnder component increases, the FKER effect becomes polarization sensitive, a known approach consists of the use of the Pockels effect to compensate for the anisotropy that appears between the TE and TM modes of light polarization.

Thus, given that the FKER effect for the TE mode is smaller than the FKER effect for the TM mode of light polarization (see curves of FIG. 1), to enable compensation for this difference, it is necessary to add the index variation Δn due to the TE-related Pockels effect. Thus, it is necessary to make waveguides in such a way that they are oriented in a direction forming an angle of 0 to 45° with respect to the crystalline direction of the substrate.

FIG. 2 illustrates a prior art phase modulator 50 of this kind with a Mach-Zehnder type structure of this kind, wherein the waveguides form an angle to the crystalline direction of the substrate. The two guiding arms, referenced 51 and 52, of the phase modulator 50 are indeed made along the directions [0,0,1], while the substrate 53 is oriented along the direction [0,-1,1] (which is the generally used section). In this example, the guiding arms are therefore oriented in such a way that the direction of propagation of light is close to 45° with respect to the cleaved faces 56 of the substrate. This orientation of the guide implies the making of bends in the active waveguide, thus complicating the manufacturing technology.

These devices however have several drawbacks. The Pockels effect can compensate for the FKER effect only up to a certain sensitivity Sp which still remains very low. Indeed, when the angle to be formed between the crystalline direction of the waveguide and that of the substrate is zero, the Pockels effect (Sp) is the maximum and it is therefore no longer possible to compensate for the FKER effect beyond. This compensation limit implies a limiting of the sensitivity of the component (this limit is represented by a double arrow, referenced L in FIG. 1, and corresponding to the maximum sensitivity Sp due to the Pockels effect).

Now the problem that it is sought to resolve is to make a light-polarization-independent phase modulator having a high sensitivity S so that it can respond to a low control voltage.

The present invention makes it possible to overcome the above-mentioned drawbacks because it proposes a light-polarization-insensitive semiconductor phase modulator having a very high sensitivity S.

SUMMARY OF THE INVENTION

The invention relates more particularly to a semiconductor phase modulator having a vertical structure comprising successively a lower cladding layer, an active waveguide and an upper cladding layer, deposited on a substrate made of III-V material, wherein the active waveguide comprises at least one first active layer and one second active layer of compensation, said first active layer having a first photoluminescence wavelength, said second layer of compensation having a second photoluminescence wavelength, wherein said modulator works with an operating wavelength that is higher than said first photoluminescence wavelength by a value ranging from 80 to 200 nm, and wherein said operating wavelength is greater than said second photoluminescence wavelength by a value of over 300 nm.

Preferably, the operating wavelength is greater than the first photoluminescence wavelength by a value ranging from 80 to 150 nm and is greater than the second photoluminescence wavelength by a value greater than 350 nm.

According to another characteristic of the invention, the first material constituting the first active layer and the second material constituting the second active layer of compensation are quaternary materials.

According to another characteristic of the invention, the ratio of the thickness of the first active layer to the thickness of the second active layer of compensation ranges from 1 to 2.5.

The fact of using two different materials forming at least two layers to make the active guide of the component makes it possible to obtain a light-polarization-insensitive component having high sensitivity. The first material constituting the first active layer indeed has an FKER effect in the range of operating wavelengths, while the second material constituting the second active layer of compensation has a TE mode Pockels effect, in the range of operating wavelengths, enabling compensation for the anisotropy between the TE and TM modes due to the FKER effect of the first material.

BRIEF DESCRIPTION OF THE DRAWINGS

Other particular features and advantages of the invention shall appear from the following description given by way of a non-restrictive illustration and made with reference to the appended figures, of which:

FIG. 1, which has already been described, shows curves representing the sensitivity S of a standard Mach-Zehnder type component comprising an active waveguide consisting of a single material, the sensitivity S being plotted as a function of the operating wavelength λ, FIG. 2, already described, shows a top view of the component of FIG. 1.

MORE DETAILED DESCRIPTION

Figure 3:
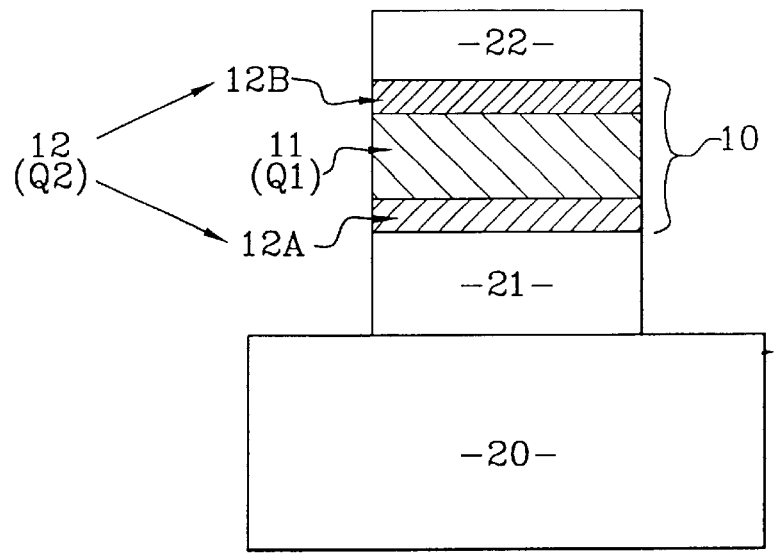
FIG. 3 shows a cross-section view of an active waveguide designed for a component according to the invention.

FIG. 3 gives a detailed view of a cross-section view of the structure of the active waveguide of a phase modulator for a Mach-Zehnder structure according to an embodiment of the invention.

The active waveguide, referenced 10, is positioned between a lower cladding layer 21 and an upper cladding layer 22. The different layers are deposited successively by a standard epitaxy method, for example by molecular beam epitaxy (MBE), on a substrate 20 made of III-V material such as indium phosphide InP for example. The lower cladding layer 21 and upper cladding layer 22 are made out of the same material as the substrate 20 and are respectively doped with carriers of a first type (for example n type carriers), and carriers of a second type (p type carriers in the example).

The active waveguide 10 comprises at least one first active layer 11 and one second active compensation layer 12. The materials $Q_1$ and $Q_2$ for the constitution of these two layers, 11 and 12 respectively, are non-doped quaternary materials, for example InGaAsP. They are differentiated by their photoluminescence wavelength as well as by their refraction index. In the example of FIG. 3, the second active compensation layer 12 is separated into two sub-layers 12A and 12B positioned respectively below and above the first active layer 11. Of course, this arrangement is just a purely illustrative example and other variants are possible. Thus, for example, the first active layer 11 can also be separated into several sub-layers between which sub-layers of the second active compensation lay are positioned.

The influence of the two materials constituting the two layers 11 and 12 of the active guide is explained in greater detail hereinafter in the description, with reference to FIG. 5.

Figure 4:
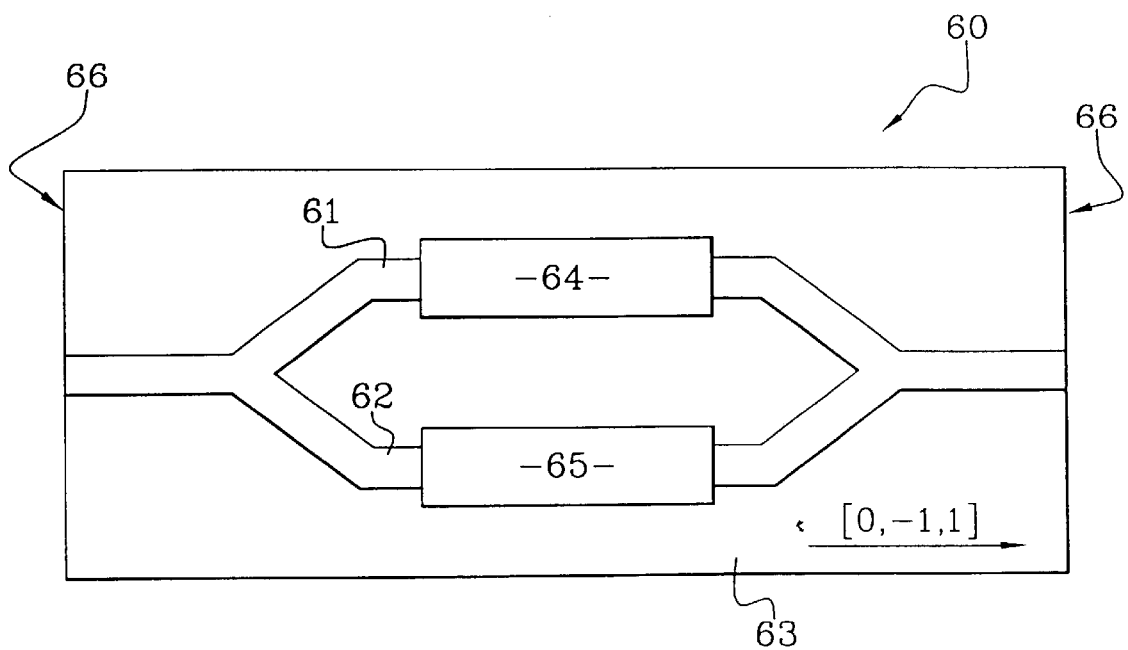
FIG. 4 shows a top view of a component according to the invention comprising the multilayer-structured active waveguide of FIG. 3.

FIG. 4 gives a schematic top view of a phase modulator according to the invention. Given the great sensitivity sought, the Pockels effect of the component must be very high in order to compensate for a part of the anisotropy between the TE and TM light polarization modes. The great sensitivity sought therefore dictates an orientation of the guiding arms perpendicularly to the cleaving planes 66 of the component. Furthermore, the active guide forming the guiding arms 61 and 62 of the component 60 comprises two types of materials in order to compensate for the remaining anisotropy and obtain light polarization independence. The fact of making the guiding arms straight and perpendicular to the cleaving planes simplifies the technology of manufacture since it is no longer necessary to control the making of bends in order to orient the active guide in a particular direction. Upper electrodes 65 and 65 are positioned above the two guiding arms 61, 62. They make it possible to ensure the working of the phase modulator when an electrical field is applied thereto.

Figure 5:
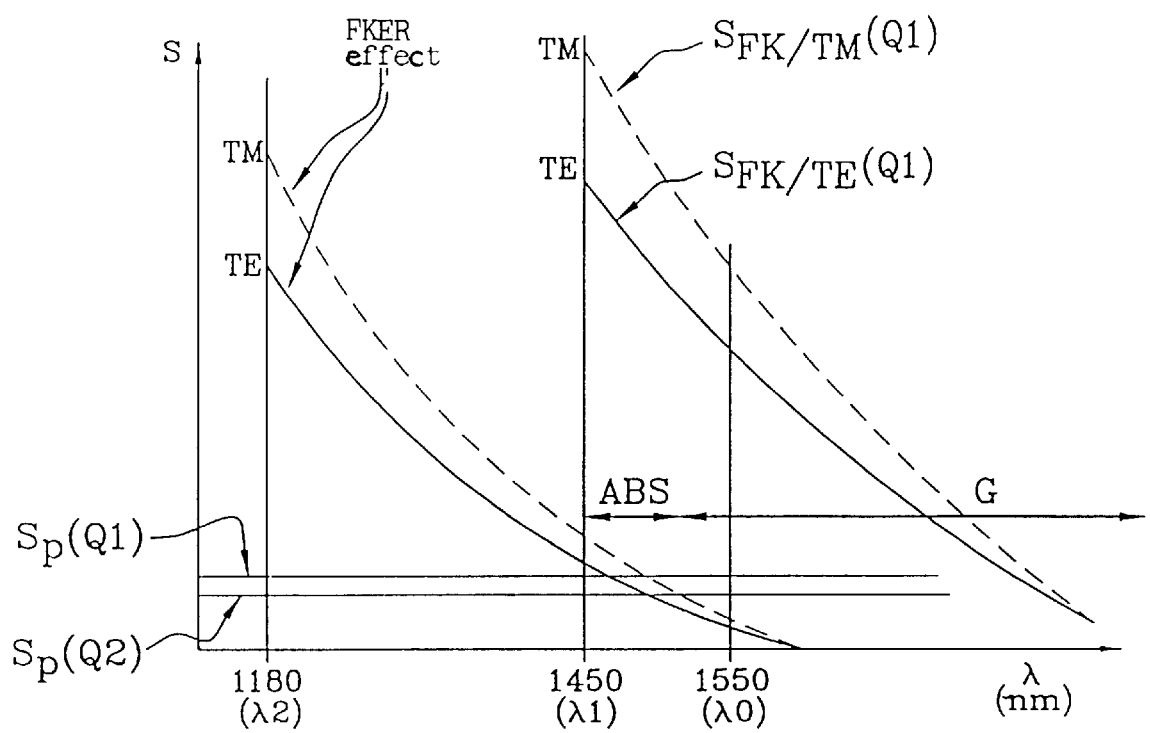
FIG. 5 shows curves representing the sensitivity S of the component of FIG. 4 as a function of the operating wavelength λ.

FIG. 5 shows curves of sensitivity S of the two materials constituting the active waveguide as a function of the operating wavelength $\lambda$. These curves enable an understanding of the effects brought into play during the working of the phase modulator according to the invention.

The material $Q_1$ for the constitution of the first active layer 11 of the waveguide has a photoluminescence wavelength $\lambda_1$ while the material $Q_2$ constituting the second active layer of compensation 12 has another photoluminescence wavelength $\lambda_2$. These two wavelengths $\lambda_1$ and $\lambda_2$ are intrinsic to the materials used and are therefore fixed. Furthermore, to provide for optical guidance, the refraction index $n_1$ of the first material $Q_1$ and the refraction index $n_2$ of the second material $Q_2$ are greater than the refraction index $n_3$ of the cladding layers 21 and 22.

To provide for the working of the phase modulator according to the invention, the materials constituting the active guide must be transparent to the operating wavelength $\lambda$. It is therefore necessary that the range of operating wavelengths $\lambda$ should be greater than the highest photoluminescence wavelength ($\lambda_1$ in this example). Furthermore, if the operating wavelength $\lambda$ is too close to the highest photoluminescence wavelength $\lambda_1$, the absorption in the corresponding first material $Q_1$ becomes increasingly great. Now, to have a phase modulator capable of working accurately, the phase must be predominant over the absorption. There is therefore a predominant absorption zone referenced ABS in FIG. 5 above which the range of operating wavelengths, referenced G in FIG. 5, must preferably be located to enable the phase modulator to work accurately.

The first material $Q_1$ of the first active layer 11 has a Franz-Keldysh Electro-Refraction effect FKER that is highly dependent on the light polarization when the sensitivity S increases. Since the guide is made in a direction that forms an angle of zero with the crystalline direction of the substrate, the first material also has a Pockels effect $S_p(Q1)$ $(=\Delta_{np}(Q_1)/\Delta E)$ that is maximum, according to the TE mode which is added to the effect FKER $S_{FK/TE}(Q1)$ $(=\Delta_{nFK/TE}(Q_1)/\Delta E)$ according to the TE mode. Since the FKER effect $S_{FK/TE}(Q1)$ $(=\Delta_{nFK/TE}(Q_1)/\Delta E)$ according to the TE mode is smaller than the FKER effect $S_{FK/TM}(Q1)$ $(=\Delta_{nFK/TM}(Q_1)/\Delta E)$ according to the TM mode, the Pockels effect $S_p(Q1)$ $(=\Delta_{nFK/TM}(Q_1)/\Delta E)$ enables compensation for a part of the anisotropy between the TE and TM modes. However, when the sensitivity S becomes high, the anisotropy between the two light polarization modes become so great that the Pockels effect of the first material is no longer sufficient to compensate for it.

The second material $Q_2$ of the second active layer of compensation 12 is therefore designed to provide compensation for the remaining birefringence in order to make the phase modulator light-polarization-insensitive for a high level of sensitivity. The FKER effect of this second material $Q_2$ is negligible as compared with that of the first material $Q_1$, in the range G of operating wavelengths considered. This FKER effect is indeed shifted towards the second photoluminescence wavelength $\lambda_2$, which is far smaller than the wavelength $\lambda_1$ of the first material $Q_1$. The second material $Q_2$ therefore, in the operating wavelengths considered, has only a Pockels effect $S_p(Q2)$ $(=\Delta_{np}(Q_2)/\Delta E)$. The Pockels effect of this second material $Q_2$, according to the TE mode, is therefore added to the FKER effect according to the TE mode and to the Pockels effect according to the TE mode of the first material $Q_1$ in order to compensate entirely for the anisotropy between the two TE and TM polarization modes.

Through the structure of the active waveguide of the phase modulator according to the invention, there is thus obtained a light-polarization-insensitive component capable of working with high sensitivity, namely with a low control voltage sufficient to make it work for a given capacitance C.

A particular example described here below and illustrated in FIG. 5 makes it possible to underpin the description. Naturally, the invention is not limited to this example, which is given only by way of an illustration. In this example, the first material Q1 has a photoluminescence wavelength $\lambda_1$ equal to 1450 nm, while the second material Q2 has a photoluminescence wavelength $\lambda_2$ equal to 1180 nm. The operating wavelength $\lambda_0$ of the modulator according to the invention is located in a range higher than the predominant zone of absorption ABS of the first material. For this purpose, this operating wavelength $\lambda_0$ is preferably greater than $\lambda_1$ by a value of 80 nm. Indeed, if the operating wavelength $\lambda_0$ is greater than $\lambda_1$ by only 60 nm, there is a risk of observing an excessively high absorption as compared with the index variation $\Delta_n$ in the material and of witnessing a phenomenon of electro-absorption instead of electro-refraction.

Furthermore, in order that the modulator may have a satisfactory sensitivity S, the operating wavelength $\lambda_0$ should not itself exceed a certain upper limit. For this purpose, the operating wavelength $\lambda_0$ is greater than $\lambda_1$ by a value of 80 to 200 nm. Preferably, the difference between $\lambda_0$ and $\lambda_1$ is greater than 150 nm. In this special example, the operating wavelength $\lambda_0$ is equal to 1550 nm.

Furthermore, this range G of operating wavelengths, as compared with the second material $Q_2$, must be such that the difference between the operating wavelength $\lambda_0$ and the second photoluminescence wavelength $\lambda_2$ is greater than 300 nm, preferably greater than 350 nm. This difference between $\lambda_0$ and $\lambda_2$ is necessary so that the FKER effect of the second material $Q_2$ may be overlooked with respect to the FKER effect of the first material $Q_1$.

Furthermore, the ratio of the thickness between the two active layers is very great to obtain the desired compensation. This ratio of the thickness is in fact conditioned by the value of the operating wavelength $\lambda_0$ in relation to the photoluminescence wavelength $\lambda_1$ and $\lambda_2$ of the materials $Q_1$ and $Q_2$ constituting these layers. In this particular example, the thickness of the first active layer 11 (first material $Q_1$) is equal to 0.3 $\mu$m and the thickness of each sub-layer 12A, 12B of the second active layer of compensation 12 (second material $Q_2$) is equal to 0.1 $\mu$m. The ratio of the thickness of the first active layer to the thickness of the second active layer of compensation is therefore equal to 1.5. In general, this ratio may vary, according to the value of the operating wavelength $\lambda_0$, from 1 to 2.5.

Table I, appended to the end of the description, summarizes the phenomena brought into play for each material $Q_1$ and $Q_2$ constituting the active guide in this particular example. The compensation for the FKER effect, according to the TE mode, of the first material $Q_1$ ($\Delta_{nFK/TE}(Q_1)$) is therefore obtained by the Pockels ($\Delta_{nP}(Q_1)$) effect of the first material $Q_1$ as well as the Pockels effect ($\Delta_{nP}(Q_2)$) of the second material $Q_2$. This compensation makes it possible to obtain the following relationship:

$$\Delta_{nFK/TE}(Q_1)+\Delta_{nP}(Q_1)+\Delta_{nP}(Q_2)=\Delta_{nFK/TM}(Q_1).$$

This relationship confirms the fact that the modulator according to the invention is independent of light polarization, and that this is the case whatever the sensitivity. It is therefore possible to make a modulator with high sensitivity, namely one that can be controlled with low voltage, unlike the standard phase modulators. Typically, the control voltage of a phase modulator according to the invention is reduced by a factor of 10 as compared with the control voltage of a standard modulator.

In brief, the first material $Q_1$ gives the total sensitivity of the modulator while the second material $Q_2$ is used to compensate for the anisotropy between the TE and TM modes of light polarization. Furthermore, the guiding arms of the phase modulator are made in a direction that is straight and perpendicular to the planes of cleavage of the component, so much so that there is no longer any need to make bends, and the manufacturing technology is thereby facilitated.

|  | TM | | TE | |
|---|---|---|---|---|
|  | FKER | Pockels | FKER | Pockels |
| $Q_1$ | $\Delta_{nFK/TM}(Q_1)$ | 0 | $\Delta_{nFK/TE}(Q_1)$ | $\Delta_{nP}(Q_1)$ |
| $Q_2$ | negligible | 0 | negligible | $\Delta_{nP}(Q_2)$ |
| TOTAL | $\Delta_{nFK/TM}(Q_1)$ | | $\Delta_{nFK/TE}(Q_1)$ | $+\Delta_{nP}(Q_1)$ $+\Delta_{nP}(Q_2)$ |

What is claimed is:

1. A semiconductor phase modulator having a structure comprising successively a lower cladding layer, an active waveguide and an upper cladding layer, deposited on a substrate made of III-V material, wherein the active waveguide comprises at least one first active layer and one second active layer of compensation, said first active layer having a first photoluminescence wavelength, said second layer of compensation having a second photoluminescence wavelength, wherein said modulator works with an operating wavelength that is higher than said first photoluminescence wavelength by a value ranging from 80 to 200 nm, and wherein said operating wavelength is greater than said second photoluminescence wavelength by a value of over 300 nm.

2. A modulator according to claim 1, wherein the operating wavelength is greater than the first photoluminescence wavelength by a value ranging from 80 to 150 nm.

3. A modulator according to claim 1, wherein the operating wavelength is greater than the second photoluminescence wavelength by a value greater than 350 nm.

4. A modulator according to claim 1, wherein the first material constituting the first active layer and the second material constituting the second active layer of compensation are quaternary materials.

5. A modulator according to claim 1, wherein the ratio of the thickness of the first active layer to the thickness of the second active layer of compensation ranges from 1 to 2.5.

* * * * *